United States Patent
Grohn

(10) Patent No.: US 7,046,721 B2
(45) Date of Patent: May 16, 2006

(54) SYSTEM AND METHOD TO ENHANCE THE CAPACITY OF A COMMUNICATION LINK

(75) Inventor: Ossi Ilari Grohn, Apex, NC (US)

(73) Assignee: Ericsson Inc., Research Triangle Park, NC (US)

( * ) Notice: Subject to any disclaimer, the term of this patent is extended or adjusted under 35 U.S.C. 154(b) by 947 days.

(21) Appl. No.: 09/812,763

(22) Filed: Mar. 20, 2001

(65) Prior Publication Data

US 2002/0136281 A1   Sep. 26, 2002

(51) Int. Cl.
    *H04B 1/38* (2006.01)
(52) U.S. Cl. ...................... 375/219; 375/371
(58) Field of Classification Search ............... 375/219, 375/295, 316, 340, 342, 371, 375, 279, 308, 375/329, 226, 285; 332/103, 144; 455/67.11, 455/67.13, 67.16; 370/516
See application file for complete search history.

(56) References Cited

U.S. PATENT DOCUMENTS

| | | | | |
|---|---|---|---|---|
| 4,810,977 A | * | 3/1989 | Flugstad et al. | 332/127 |
| 4,916,411 A | * | 4/1990 | Lymer | 331/25 |
| 5,515,404 A | * | 5/1996 | Pearce | 375/371 |
| 5,598,130 A | * | 1/1997 | Mesuda et al. | 332/119 |
| 5,793,822 A | * | 8/1998 | Anderson et al. | 375/371 |
| 6,076,175 A | * | 6/2000 | Drost et al. | 714/704 |
| 6,181,758 B1 | * | 1/2001 | Trimmel et al. | 375/376 |
| 6,493,408 B1 | * | 12/2002 | Kobayashi | 375/357 |

* cited by examiner

*Primary Examiner*—Khanh Tran
(74) *Attorney, Agent, or Firm*—Woods, Phillips, Van Santen, Clark & Mortimer

(57) ABSTRACT

A method and apparatus encodes data on a clock pulse signal by phase modulating a clock pulse signal by introducing a sinusoidal jitter modulation to the clock pulse signal to selectively introduce intentional jitter at clock pulse transitions, wherein the sinusoidal jitter has selectable jitter frequencies each having a given amplitude. This is followed by a data signal which may include additional data that has an encoded format of binary ones and zeros, such that the appearance of the binary one in the data signal causes the phase modulation of the clock pulse signal by the selection of one of the jitter frequencies of a given amplitude. The appearance of a binary zero causes the selection of another frequency of a given amplitude to thereby modulate the clock pulse signal resulting in a phase modulated clock pulse signal that includes the encoded data in the data or additional signal.

15 Claims, 5 Drawing Sheets

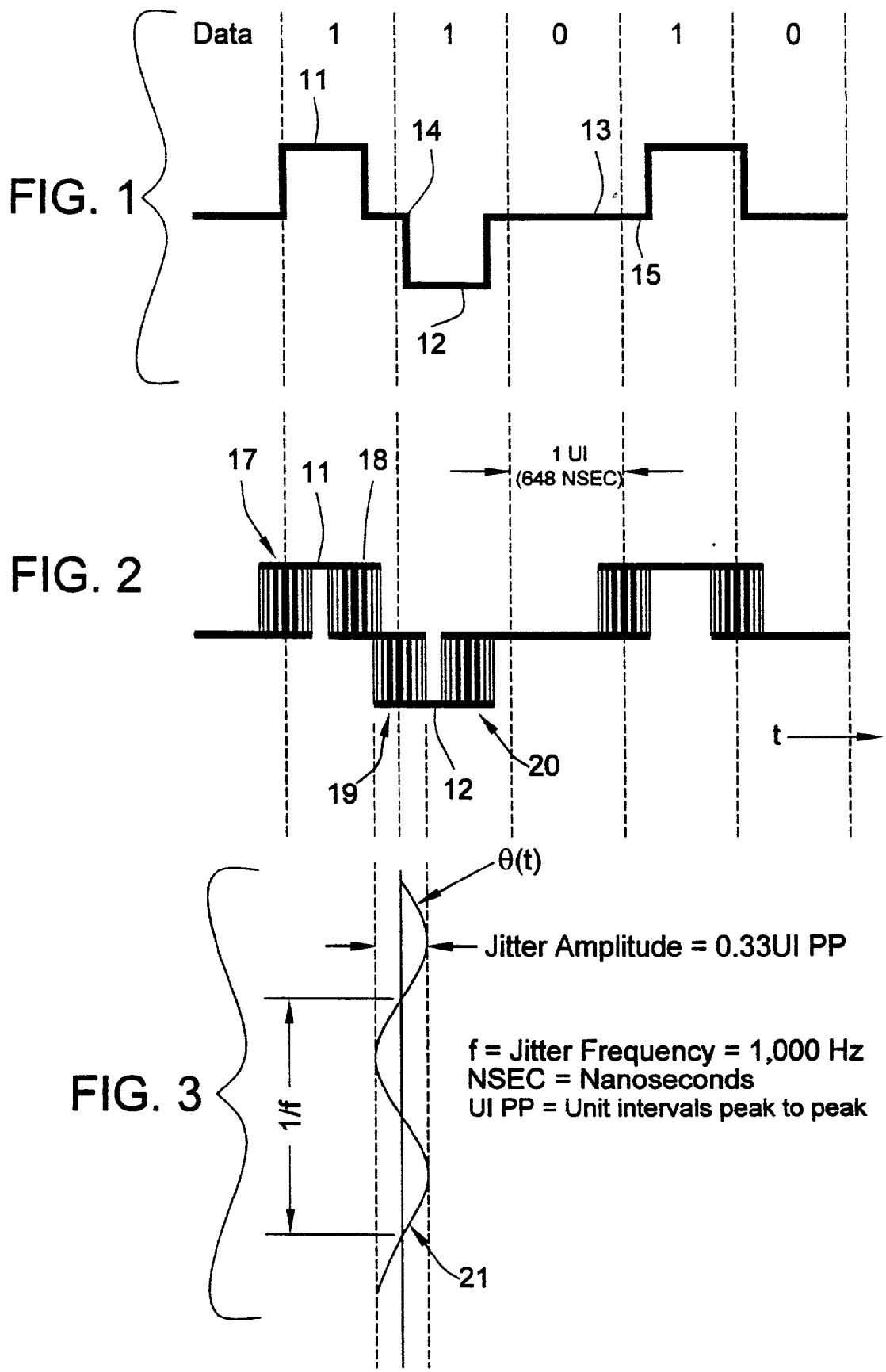

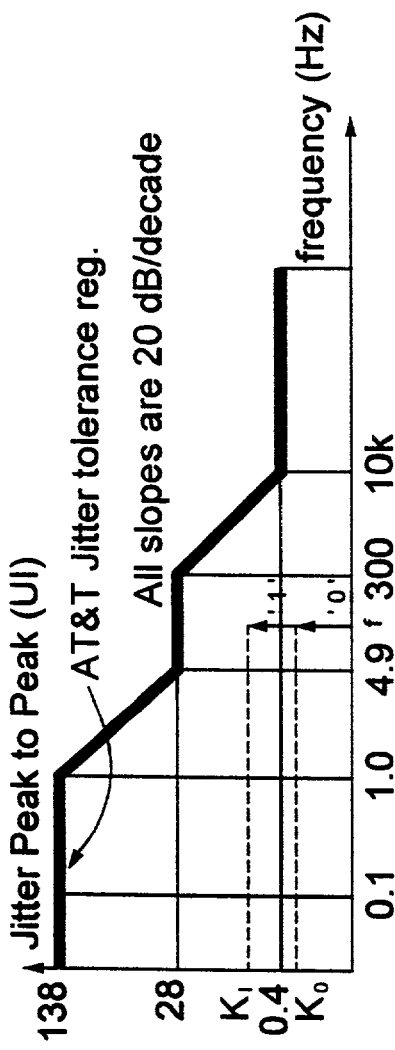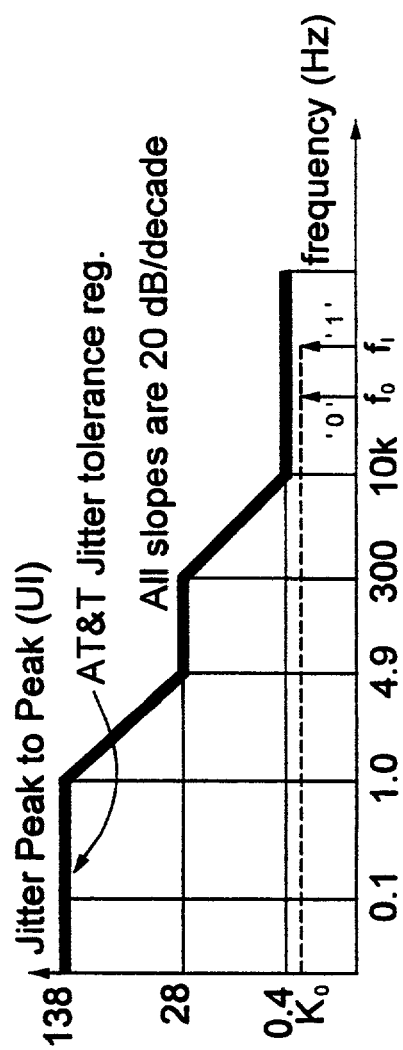

SYSTEM AND METHOD TO ENHANCE THE CAPACITY OF A COMMUNICATION LINK

BACKGROUND OF THE INVENTION

This invention relates generally to a telecommunications system and, more particularly, to a method and apparatus to send additional information over a data or telecommunications link without disturbing existing data being transmitted over the link. Communication links such as a T1 digital link between devices normally have a defined data rate and format which limits the amount of information that can be sent over the link. Historically a need to transmit more data has been accomplished by adding a new link or increasing the data rate on an existing link. This is not always economically feasible due to the high cost of additional cable for the new link. Where the existing data transmission rate is already very high increasing the data rate is not always possible.

SUMMARY OF THE INVENTION

Intentionally introduced jitter at pulse transitions of a transmit clock pulse signals may be utilized to effect phase modulation of the clock pulse signal which allows for the transmission of additional data over a communication data link. Since jitter has both amplitude and frequency components, additional data can be encoded by using select jitter amplitudes at the same frequency. Another option is to employ different frequencies having the same amplitude.

An enhanced capacity communication system includes a data signal to be delivered via a sending device and a communication link to a receiving device. The sending device comprises a data signal framer that receives the data signal, a transmit clock pulse signal, and a phase modulator that receives an additional data signal and the transmit clock pulse signal. The phase modulator provides a sinusoidal jitter modulation that phase modulates the clock pulse signal by introducing intentional jitter at clock pulse transitions. The sinusoidal jitter modulation has selectable jitter frequencies each having a given amplitude.

BRIEF DESCRIPTION OF THE DRAWINGS

These and other features of the present invention will be more readily understood by those skilled in the art when read in conjunction within the appended drawings, wherein:

FIG. 1 illustrates a "snapshot" of a fixed data pattern of a T1 data signal that has inherent sinusoidal jitter modulation;

FIG. 2 represents a composite view of the T1 data signal pulses of FIG. 1 as viewed on an oscilloscope;

FIG. 3 shows a plot of the jitter function θ(t);

FIG. 4 graphically depicts intentional jitter characteristics where additional data is encoded by using two different jitter amplitudes $K_0$ and $K_1$ at the same frequency f;

FIG. 5 graphically depicts intentional jitter characteristics where additional data is encoded using two different jitter frequencies $f_0$ and $f_1$ of the same amplitude K;

DETAILED DESCRIPTION OF THE INVENTION

Figure 6:
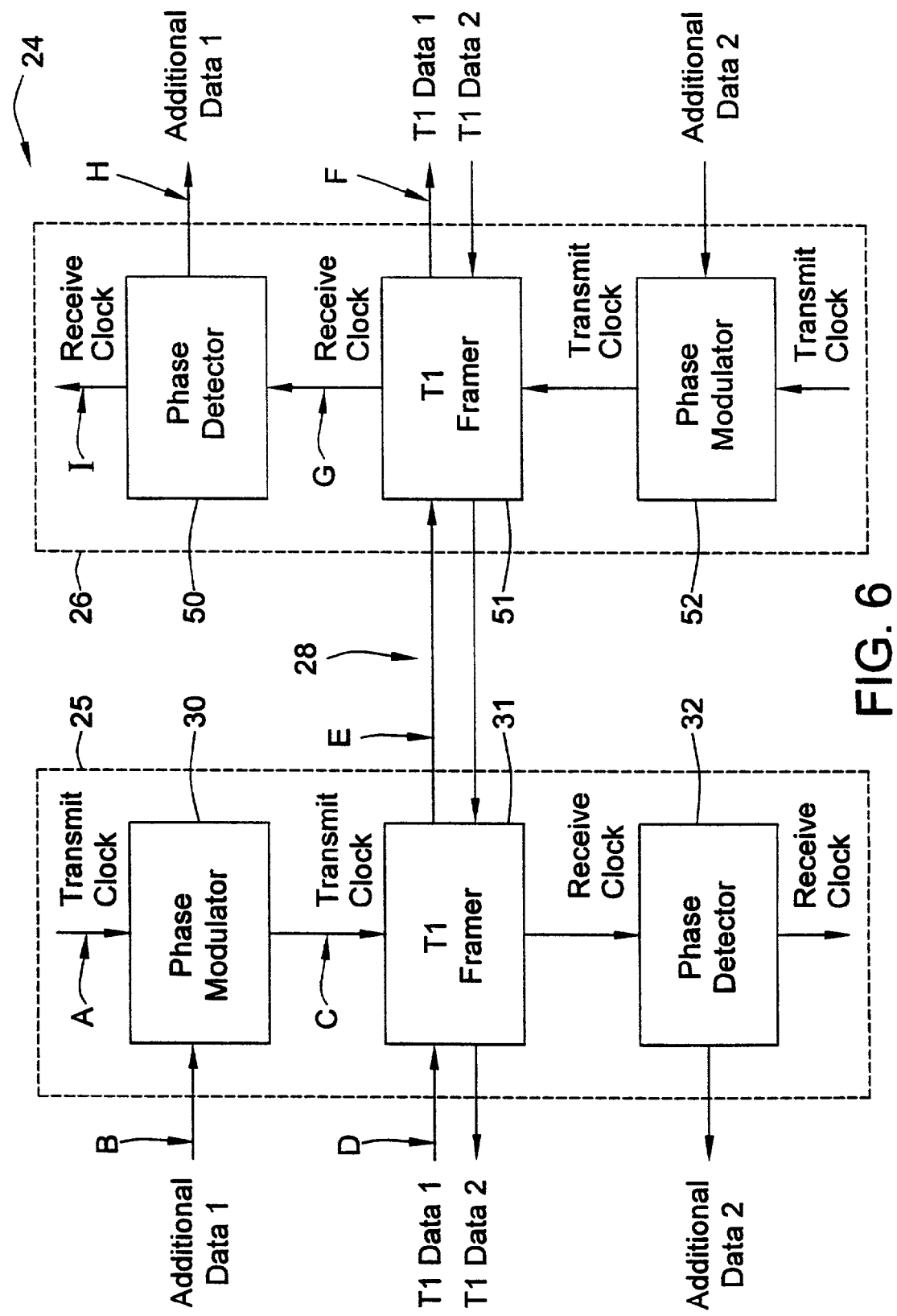
FIG. 6 is a block diagram of an embodiment of the invention in a system in which the amplitude or the frequency of the jitter can be modulated by additional data.

Reference is now made to FIGS. 1, 2 and 3 which when taken together and described hereinafter will provide an explanation of the terms jitter, timing jitter and intentional jitter. Broadly speaking in the electrical arts "jitter" is defined as a small rapid waveform due to mechanical variation in a waveform due to mechanical vibrations, fluctuations in supply voltages, control-system instability and/or other causes. The term "timing jitter", as it will be used hereinafter is to be understood in the context of a T1 digital communication system. In such a digital communication system a T1 signal is made up of pulses representing logical ones that alternate in polarity, see pulses 11 and 12 in FIG. 1. A logical zero is represented by the absence of a pulse (no signal) as is indicated by reference numeral 13.

In a digital transmission environment "timing jitter" is the deviation in time between when the pulse transitions occur when they ideally should and when the digital decoding equipment expects them to occur. This timing jitter is, in effect, unintentional phase modulation, which has both an amplitude and frequency component. The timing jitter amplitude is the magnitude of a pulse phase deviation; its frequency is a measure of how rapidly the phase is changing. The measurement gauge for amplitude is called the unit interval (UI), which is the time period (648 nanoseconds) that it takes one bit to pass a fixed point at the T1 transmission rate (1.544 Mbit/second). FIG. 1 shows a "snapshot" of a fixed data pattern being transmitted by a T1 signal that is experiencing a sinusoidal jitter modulation at pulse transitions. At the instant depicted in FIG. 1, phase shift can be seen in the second and third pulse as indicated by reference numbers 14 and 15. In FIG. 1 the pulse width equals one-half a bit period.

FIG. 2 is a composite view of the same T1 signal of FIG. 1 where the T1 signal is viewed on an oscilloscope. The T1 pulse 11 is depicted as having blurred edges 17, 18, whereas the T1 pulse 12 is depicted as having blurred edges 19 and 20. The blurred edges 17, 18 of pulse 11 and the blurred edges 19 and 20 of pulse 12 visually indicate the amplitude, or range, of the sinusoidal jitter modulation.

For purposes of providing an explanation of sinusoidal jitter modulation of a pulse, attention is directed to FIG. 3 which shows directly below pulse 12 in FIG. 2 a plot of the jitter function θ(t), which is the expression used to represent phase deviation over time. In FIG. 3 the arrow 21 points to a plot of the jitter function θ(t). This plot reveals the jitter amplitude of 0.33 $UI_{pp}$ (unit intervals, peak to peak) and the jitter frequency of 1000 Hz. The pulse-to-pulse phase deviation is a result of both amplitude and the phase of the jitter. The expression for sinusoidal phase modulation is:

$$\theta(t) = A \sin(\omega t),$$

Where A=jitter amplitude (peak) in radians, and ω=jitter frequency in radians/second. The slope of this function, which is the rate of change of the phase, determines how much the pulses will vary from their ideal position over a given time interval. An expression for the slope can be found by differentiating θ(t) with respect to time, which gives:

$$d\theta/dt = \omega A \cos(\omega t), \text{ in radians/second}$$

By integrating the slope over a time period T equal to the maximum time between pulses, and expression for the maximum phase shift (phase deviation) between pulses is obtained:

$$\theta_{max} = 2 A \sin(\omega t/2), \text{ in radians}$$

For most cases, the period of the jitter frequency will be much larger than T, and the small-angle approximation, sin(x)=x, can be used to reduce the expression to:

$$\theta_{max} = A\omega T, \text{ for } 1/\omega \gg T,$$

This expression clearly shows that the pulse-to-pulse deviation caused by jitter is a function of both the amplitude and frequency of the jitter. A more useful form of the expression can be obtained by converting to $UI_{pp}$ and Hertz:

$$\theta_{max} = 0.03 Kf, \text{ in } UI,$$

Where K=jitter amplitude in $UI_{pp}$, and f=jitter frequency in kHz.

With the foregoing theoretical background set forth, attention will now be directed to an explanation of the subject invention.

This invention uses intentional jitter (phase modulation) of transmit clock pulse signals to transmit additional data over a T1 communication link. Since jitter has both an amplitude and frequency component, the additional data can be encoded on the transmit clock pulse signals by using two different jitter amplitudes ($K_1$ and $K_0$) at the same frequency (f) to represent binary values one and zero. Another option is to use two different jitter frequencies ($f_1$ and $f_0$) at the same amplitude (K) to represent the one and zero bits.

FIG. 4 is a graph that depicts amplitude encoding $K_0$ and $K_1$ that represent a 0 and 1 where the frequency f is constant.

FIG. 5 is a graph that depicts frequency encoding where the amplitude K is constant and two different jitter frequencies $f_0$ and $f_1$, represent zero and one.

It is to be noted that in order for the digital decoding equipment to recover the regular T1 data, the jitter amplitude and frequency for the additional data must be within the jitter tolerance (jitter accommodation) specifications of the equipment.

Figure 7:
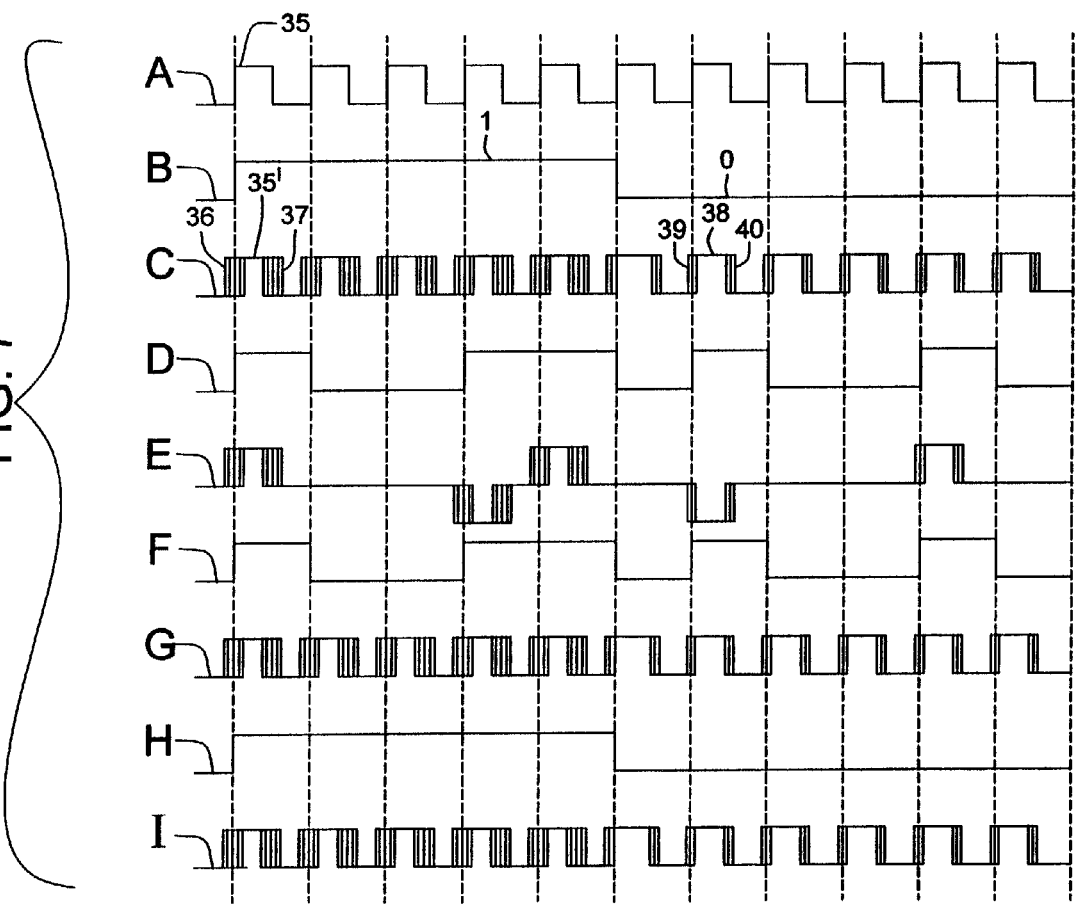
FIG. 7 is a timing diagram of the system of FIG. 6 which shows the pulse relationship at different locations of the system for amplitude encoding.
Figure 8:
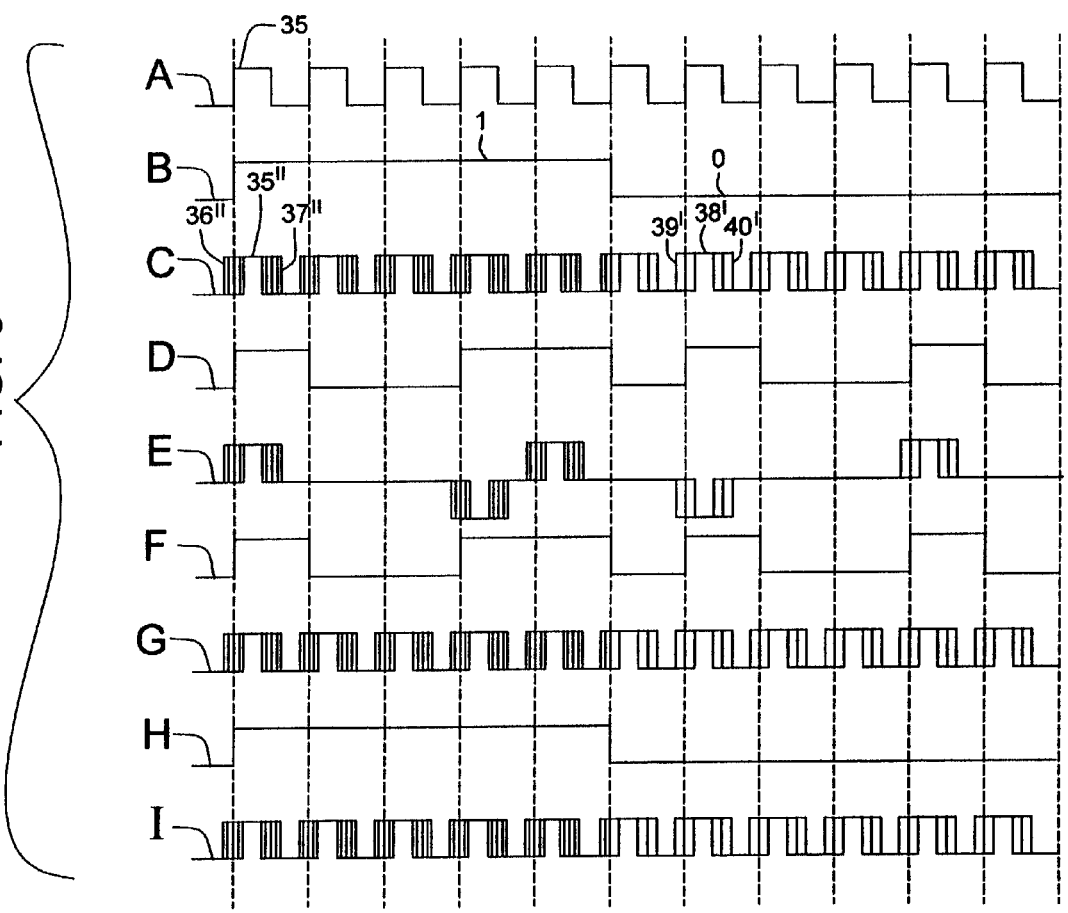
FIG. 8 is a timing diagram of the system of FIG. 6 which shows the pulse relationship at different locations of the system for frequency encoding.

Reference is now made to FIGS. 6, 7 and 8 which when taken together and explained will provide an understanding of one embodiment of the invention.

FIG. 6 is a block diagram of an enhanced capacity communication system 24 in accordance with the invention, which depicts in broken line a sending device or transmitter 25, and a receiving device or receiver 26. As such, the system 24 may be referred to as a sender/receiver. The sending device 25 and receiving device 26 are interconnected by a T1 communication link indicated by an arrow 28. A brief description of the basic components that are included in the sending device 25 and the receiving device will now enfold and an explanation of the dynamic interrelationship of the respective components one to another will be accomplished by reference to the timing diagrams of FIGS. 7 and 8 which respectively show the pulse relationship for amplitude encoding FIG. 7 and frequency encoding FIG. 8 at different locations of the communication system 24. The sending device 25 has three basic components, namely, a phase modulator 30, a T1 data signal framer 31 and a phase detector 32 all which are interconnected as shown by lines with arrow heads that depict the direction pulse trains travel in the receiver 26. The T1 data communication link 28 interconnects the sending device 25 with the receiving device 26.

It is to be understood that what is described above as a sending device 25 may also function as a receiving device. The description of the system that follows will not describe the receiving function of sending device 25 just noted. It will be self evident from the description of the sending and receiving functions of the sending device 25 and receiving device 26 that a send and receive function described with respect to sending device 25 and 26 are the same.

The receiving device 26 includes a phase detector 50, a T1 data signal framer 51 and a phase modulator 52 all of which are interconnected as shown by lines with arrow heads that depict the direction pulse trains travel in the receiver 26 between the components of the system.

In order to appreciate the dynamic nature of the relationships of the various signals involved in the operation of the invention it is to be observed that capital letters A through I, each having an arrow directed to a location in the system have been employed to facilitate an understanding of the timing charts of FIGS. 7 and 8. The timing charts of FIGS. 7 and 8 depict pulse trains as they appear at locations A through I.

Attention will now be directed to an explanation of amplitude encoding of additional data in the communication system 24 of FIG. 6. The timing diagram of FIG. 7 shows the pulse relationships at different locations of the system for amplitude encoding of additional data. Accordingly a clock pulse train A of the nature illustrated in FIG. 7 is delivered to the phase modulator 30. The phase modulator 30 provides a sinusoidal jitter modulation of the clock pulse train A that phase modulates the clock pulse signal by introducing intentional jitter at clock pulse transitions. Note in this regard clock pulse 35, FIG. 7 and the sinusoidal jitter modulation which is depicted as occurring at the leading and trailing clock pulse transitions as shown at point C where the amplitude modulated clock pulse is here referenced as 35'. On line B of FIG. 7 an additional data signal is graphically depicted. This additional data signal is encoded in a format of binary ones and zeros, such that the appearance of a binary 1 in the additional data signal causes the phase modulator 30 to select a jitter frequency having a given amplitude whereas the appearance of a binary zero causes the phase modulator 30 to select another frequency that is the same as the frequency selected for a binary one, however, the amplitude of the sinusoidal jitter frequency is different. This sinusoidal amplitude distinction just noted is visually conveyed by the use of different shading of the clock pulse transitions 36, 37, such as is shown at pulse transition points of clock pulse 35', line C of FIG. 7 and on the same shaded regions 39, 40 of jitter modulated clock pulse 38.

The phase modulated clock pulse signal of line C is delivered as shown in FIG. 6 to the T1 data signal framer which simultaneously receives a T1 data signal of the nature shown on line D of FIG. 7. Line E, FIG. 7 illustrates the nature of the combined T1 data signal line D and addition data signal line B. It follows that when the combined data signal line E is delivered over the T1 data link 28 to T1 framer 51 of the receiving device 26 a decoding operation occurs and the transmitted T1 data signal of line F emerges from the T1 framer 51. The phase detector 50 of the receiving device 26 receives the sinusoidal jitter modulated clock pulse signal shown on line G of FIG. 7. The phase detector 50 decodes this signal and delivers the additional data as evidenced on line H of FIG. 7. The receive clock signal from the phase detector 50 is illustrated on the line I of FIG. 7.

Let us now turn to FIG. 8, which shows a timing diagram that shows the pulse relationships at different locations of the system for frequency encoding the sinusoidal jitter modulation of a clock pulse signal. A quick overview of FIG. 8 reveals what appears to be a timing pulse diagram that is identical to that of FIG. 7. A close visual inspection of the shading of pulse signal trains at locations C, E, G, and H of FIG. 8 reveals that the pulse trains are slightly different in appearance from that shown in FIG. 7. For example, note that the vertical shading lines 39', 40' of pulse 38', location C, FIG. 8 are spaced further apart than the vertical shading lines of corresponding pulse 38 of FIG. 7. This difference in shading is intended to visually convey the idea that the jitter frequencies employed to modulate clock pulse transitions are different and the amplitude of the jitter frequency is constant. Stated slightly differently the phase modulated clock pulse signal of line C FIG. 8 with shaded clock pulse transitions 36", 37" of phase modulated clock pulse signal 35" are now intended to convey the idea that the frequency of the sinusoidal modulation is of one selected value and has a given amplitude whereas the shade regions 39', 40' of phase modulated clock pulse signal 38' represent a different frequency but the same amplitude for the intentional sinusoidal jitter modulation of the clock pulse transitions.

The invention just described in the context of an enhanced capacity communication system broadly posses a distinctive method for encoding additional data for use in any communication system that utilizes clock pulse signals to synchronize data transmission.

It will be appreciated from the foregoing description of the physical embodiment of the invention that there is present therein a method which in its most elemental sense provides a method of encoding data on a clock pulse signal by phase modulating a clock pulse such as that depicted on line A of FIG. 7. This data may be additional data or simply data.

This method of encoding any data on a clock pulse signal involves the steps of introducing sinusoidal jitter modulation to a clock pulse signal by selectively introducing intentional jitter at clock pulse transitions. The sinusoidal jitter may have selectable jitter frequencies each having a given amplitude. This step is followed by providing a data/additional data signal that has an encoded format of binary ones and zeros, such that the appearance of binary one in the data/additional data signal causes the phase modulation of the clock pulse signal by the selection of one of the jitter frequencies of a given amplitude. The appearance of a binary zero causes the selection of another frequency of given amplitude to thereby modulate the clock pulse signal such that the clock pulse signal includes the encoded data. In the practice of the method just described the method contemplates that the sinusoidal jitter modulation having selectable jitter frequencies is such that the jitter frequencies may be different and the amplitudes are the same. It follows from the earlier description of the communication system that embodies the invention that in the practice of the inventive method the sinusoidal jitter modulation is such that the selected jitter frequencies may be the same and the amplitudes are different.

Although the invention is described with respect to a data signal encoded in a format of binary ones and zeros, the data signal could be encoded using other formats, including the use of more than two different levels or values, as will be apparent to those skilled in the art.

By using the inventive method of intentionally introducing a sinusoidal jitter modulation to clock pulse signals at the clock pulse transitions where the frequency and amplitude are selectively controllable, the method greatly enhances a communication systems capacities to handle additional data. The invention will readily find use in systems having a T1 communication link, as well as E1 and J1 links.

A person skilled in the art can make many adaptations of the above teachings which remain within the scope and spirit of the invention as described by the attached claims.

I claim:

1. An enhanced capacity communication system comprising:
   a sending device for delivering a data signal via a communication link to a receiving device,
   the sending device comprising:
   a data signal framer that receives the data signal;
   a transmit clock pulse signal; and
   a phase modulator that receives an additional data signal and the transmit clock pulse signal, the phase modulator provides a sinusoidal jitter modulation that phase modulates the clock pulse signal by introducing intentional jitter at clock pulse transitions responsive to the additional data signal, the additional data signal thereby modulates the transmit clock pulse signal to provide a phase modulated transmit clock pulse signal that is delivered to the framer for inclusion with the data signal to create a combined data signal and additional data signal that is transmitted via the communication link to the receiving device for decoding and further use.

2. The communication system of claim 1 wherein the sinusoidal jitter modulation has selectable jitter frequencies each having a given amplitude, the additional data signal having additional data encoded in a select format to cause the phase modulator to select one of the jitter frequencies of a given amplitude.

3. The communication system of claim 2 wherein the selected jitter frequencies of the sinusoidal jitter modulation are different and the amplitudes are the same.

4. The communications system of claim 2 wherein the selected jitter frequencies of the sinusoidal jitter modulation are the same and the amplitudes are different.

5. The communications system of claim 2 wherein the selective jitter frequencies of the sinusoidal jitter modulation are different and the amplitudes are different.

6. An enhanced capacity communication system comprising:
   a sending device for delivering a data signal via a communication link to a receiving device, the sending device comprising:
   a data signal framer that receives the data signal;
   a transmit clock pulse signal; and
   a phase modulator that receives an additional data signal and the transmit clock pulse signal, the phase modulator provides a sinusoidal jitter modulation that phase modulates the clock pulse signal by introducing intentional jitter at clock pulse transitions, the sinusoidal jitter modulation having selectable jitter frequencies each having a given amplitude, the additional data signal having additional data encoded in a format of binary ones and zeros, such that the appearance of a binary one in the additional data signal causes the phase modulator to select one of the jitter frequencies of a given amplitude, whereas the appearance of a binary zero causes the phase modulator to select another frequency of a given amplitude, the additional data signal thereby modulates the transmit clock pulse signal to provide a phase modulated transmit clock pulse signal that is delivered to the framer for inclusion with the data signal to create a combined data signal and additional data signal that is transmitted via the communication link to the receiving device for decoding and further use.

7. The communication system of claim 6 wherein the selected jitter frequencies of the sinusoidal jitter modulation are different and the amplitudes are the same.

8. The communications system of claim 6 wherein the selected jitter frequencies of the sinusoidal jitter modulation are the same and the amplitudes are different.

9. The communications system of claim 6 wherein the selective jitter frequencies of the sinusoidal jitter modulation are different and the amplitudes are different.

10. The communication system of claim 6 wherein the receiving device that decodes the combined data signal and the additional data signal for further use, further comprises:
   a receive framer, and
   a phase detector, the receive framer receives via the communication link the combined data signal and additional data signal, the receive framer provides a pair of output signals one of which is the same as the data signal, the other of which is delivered to the phase detector and is a phased modulated clock pulse that is identical to the phased modulated transmit clock pulse signal of the sending device, the phase detector processes the phase modulated transmit clock pulse signal and extracts the additional data encoded in the phase modulated transmit clock pulse signal and provides the additional data output signal for further use.

11. The communication system of claim 6 wherein the communication link comprises a T1 data link.

12. A system for encoding data on a clock pulse signal by phase modulating the clock pulse signal of a sending device, the system comprising:
   the sending device having a phase modulator that receives a clock pulse signal and a data encoded signal, the sending device provides a phase modulated clock pulse signal that includes the data on the data encoded signal,
   the phase modulator introduces sinusoidal jitter to the clock pulse signal by selectively introducing intentional jitter at the clock pulse transitions, wherein the sinusoidal jitter has selectable jitter frequencies each having a given amplitude, and
   the data encoded signal having encoded format of binary ones and zeros, such that the appearance of the binary one in the data encoded signal causes the phase modulation of the clock pulse signal by the selection of one of the jitter frequencies of a given amplitude and the appearance of a binary zero causes selection of another frequency of given amplitude to thereby modulate the clock pulse signal and provide the phase modulated clock pulse signal that includes the data on the data encoded signal.

13. The system of claim 12 wherein the selected jitter frequencies of the sinusoidal jitter modulation are different and the amplitudes are the same.

14. The system of claim 12 wherein the selected jitter frequencies of the sinusoidal jitter modulation are the same and the amplitudes are different.

15. The system of claim 12 wherein the selected jitter frequencies of the sinusoidal jitter modulation are different and the amplitudes are different.

* * * * *